Patented Feb. 10, 1931

1,791,820

UNITED STATES PATENT OFFICE

EMRIK IVAR LINDMAN, OF STOCKHOLM, SWEDEN, ASSIGNOR, BY MESNE ASSIGNMENTS, TO THE AEROCRETE CORPORATION OF AMERICA, OF NEW YORK, N. Y., A CORPORATION OF DELAWARE

PROCESS OF PRODUCING CELLULAR OR POROUS CONCRETE

No Drawing. Application filed November 21, 1925, Serial No. 70,695, and in Sweden November 24, 1924.

This invention relates to an improved method of producing cellular or porous concrete suitable for various purposes.

In the methods of manufacture already known, cement or cement powder, alone or with any admixture of sand or slate materials, such as ashes from alum-shale, etc. have been used for producing such concrete. However, the said materials have certain qualities that make them less suitable for an economical production of porous concrete and give certain less suitable qualities to the concrete than are secured by my present invention. The present invention has for its object the production of a cheap porous concrete with an evenly distributed porosity by reason of the addition of a specific aggregate material thereto. Such additional materials comprise slag of coal and coke, or ashes of coal and coke, both of which are included in the term "slag". Before mixing the added material is to be ground or crushed.

Slag of coal and coke and ashes of coal and coke possess desirable properties in the production of porous concrete. The material is added in such a state that it contains powder as well as larger grains. As the finer particles are active hydraulically together with the cement and as the bigger grains will act as porous bodies to prevent the formation of cracks during shrinking or drying, the strength of the concrete will be considerably increased. Thus, with thirty-five per cent coal slag, the same strength is secured as when cement alone is used, assuming the porosity to be the same in both cases. The added material should not exceed eighty per cent of the weight of the total mass, and at least ten per cent should have a grain size less than three-eighths of an inch. Porous concrete with coal slag hardens more quickly than porous concrete employing cement alone.

Having now described my invention what I claim as new therein and desire to secure by Letters Patent is:

The method of producing cellular concrete which consists in mixing cement, water, a metal powder adapted to cause generation of gas, and slag so divided as to present fine hydraulizing particles and larger particles of a size and in sufficient quantity to prevent the formation of cracks during setting, said slag not to exceed eighty per cent of the weight of the total dry ingredients of the concrete and at least ten per cent having a grain size less than three-eighths of an inch.

In witness whereof I have hereunto set my hand.

EMRIK IVAR LINDMAN.